Reissued Dec. 31, 1929

Re. 17,540

UNITED STATES PATENT OFFICE

HANS RATHSBURG, OF FURTH, GERMANY, ASSIGNOR TO RHEINISCH-WESTFALISCHE SPRENGSTOFF-AKTIENGESELLSCHAFT, OF COLOGNE, GERMANY

PRIMER COMPOSITION

No Drawing. Original application filed December 20, 1923, Serial No. 681,876. Divided and this application filed March 18, 1925, Serial No. 16,562, and in Belgium October 23, 1923. Original No. 1,586,350, dated May 25, 1926. Application for reissue filed October 18, 1929. Serial No. 400,723.

The present application is in part a continuation of application Serial No. 681,876, filed December 20, 1923.

According to German Patent Nr. 362433 (see British Patent Nr. 201009), tetracenes are used for the preparation of primer compositions for percussion caps, Flobert rifle caps, and similar ammunition.

Tetracenes are completely or partly substituted combinations with an open chain of 4 atoms of nitrogen, having the general formula:

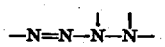

The object of the present invention is to improve upon prior compositions of the above-described character. To this end, guanylnitrosaminoguanyltetracene (likewise called guanyldiazoguanyltetracene) is used in mixture with salts of nitro-compounds (such, for instance, as the trinitroresorcinate of lead) or with well-known oxygen-containing substances, such as chlorates, nitrates and peroxides, together with friction means.

The above mentioned tetracene is the product of reaction of aminoguanidine nitrate with sodium nitrite, having the empirical formula $C_2H_8ON_{10}$; its constitution can be illustrated by the following formula:

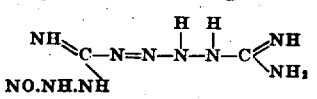

This tetracene is more insensitive to shock than any other, having more or less the sensibility of fulminate of mercury against shock and friction, and on the other hand, it is very stable in storage.

The advantages of this improvement over prior-art primer compositions, which contain solely fulminate of mercury for means of ignition, will be obvious.

I claim:

1. A primer composition comprising guanylnitrosaminoguanyltetracene admixed with a salt of an organic nitro-compound.

2. A primer composition comprising guanylnitrosaminoguanyltetracene admixed with trinitroresorcinate of lead.

In testimony whereof I have signed my name to this specification.

HANS RATHSBURG.